E. A. KELSEY.
VALVE.
APPLICATION FILED APR. 6, 1916.

1,199,568.

Patented Sept. 26, 1916.
2 SHEETS—SHEET 1.

Witnesses:
Fred Roegen
Rachel Lieberman

Edgar A. Kelsey, Inventor

By Henry Schreiter his Attorney

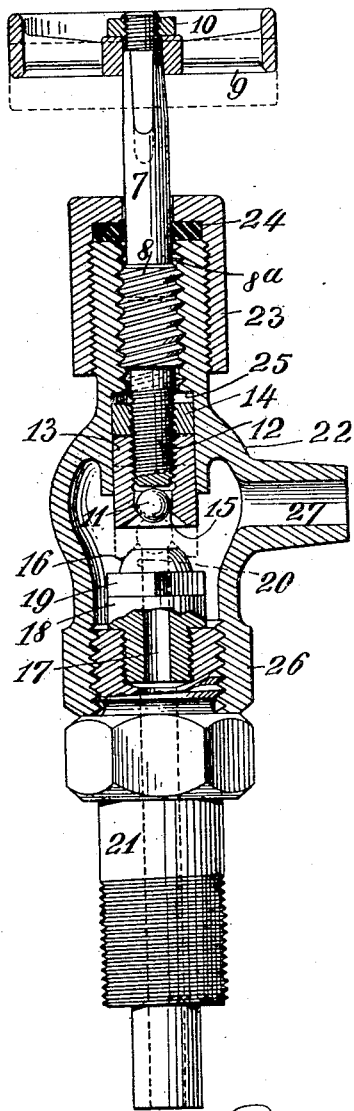

UNITED STATES PATENT OFFICE.

EDGAR A. KELSEY, OF MOUNT VERNON, NEW YORK.

VALVE.

1,199,568.      Specification of Letters Patent.     Patented Sept. 26, 1916.

Application filed April 6, 1916. Serial No. 89,319.

*To all whom it may concern:*

Be it known that I, EDGAR A. KELSEY, a citizen of the United States, and resident of Mount Vernon, county of Westchester, State of New York, have invented certain new and useful Improvements in Valves, of which the following is a full, clear, and exact specification.

The object of my invention is to improve the construction of valves to effect a dependably fluid-tight closure, capable of withstanding high pressure; to prevent deformation, and rapid wearing out, of the parts.

A further object of my invention is to so construct and arrange the component parts, that a double closure of the aperture in the valve seat is effected, and so that the parts of the valve, subjected to the wear, may be readily replaced.

These objects of my invention are accomplished by the construction of my improved valve, illustrated in the accompanying drawings, wherein—

Figure 1:
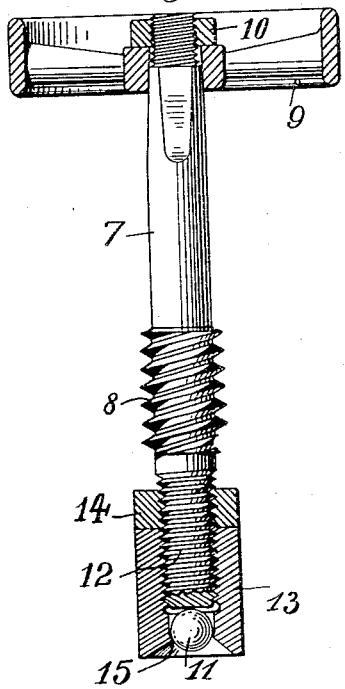
Figure 4:
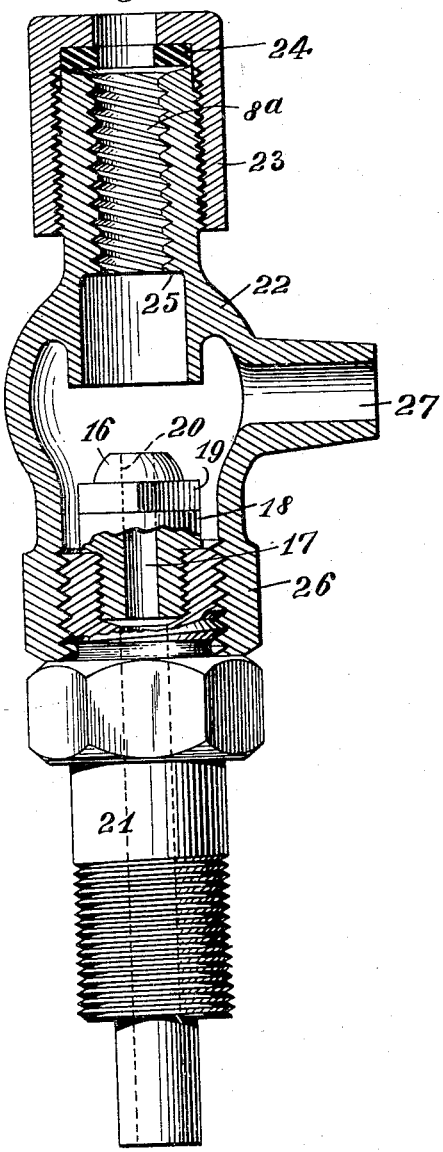
Figure 2:
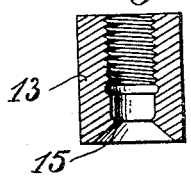
Figure 3:
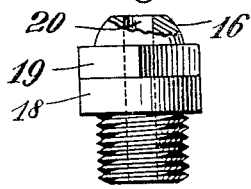

Figure 1 is an elevation, partly sectional view of the valve stem; Fig. 2 a sectional view of the sleeve for holding a ball to the end of the valve stem; Fig. 3 is a view partly in elevation and partly in section of the valve seat; Fig. 4 a view partly in section and partly in elevation of the valve casing with the valve seat secured in its place, and Fig. 5 is a view partly in section and partly in elevation of the complete valve assembled.

The valves, employed in apparatus containing fluids under high pressure, are subjected to very hard usage, which the valves constructed as heretofore known are not able to withstand. It is quite impossible in these valves to effect a fluid-tight closing without driving in the valve plug into its seat very hard. The plugs of these valves are usually conically shaped, and ground into the valve seats, and the driving in, of the plug, into the valve seat, rapidly wears out the valve seat, or of the plug, or both, and results in leakage; also the screw threads on the valve stem, and in the valve casing wear out rapidly, owing to the great strains which must be exerted thereon. The wearing out of the screw threads renders it difficult, in fact impossible, to close the valve, and the leaking of the fluid held under high pressure results therefrom. A conically shaped valve plug has, and always will have, the tendency to wear out the orifice in the valve seat, even if no grit happens to lodge between the contacting surfaces, by which the trouble is so greatly aggravated. To obviate these difficulties, I propose to employ, in place of the conical valve plug, a ball for closing the orifice of the valve seat, which is held to the stem by a sleeve, and to effect a double closing of the valve, I make use of the sleeve, whereby the ball is connected to the valve stem, by shaping it concavely, and by convexly shaping the valve seat. For this purpose, I also provide for an adjustment of the sleeve, holding the ball to the valve stem, so that the ball will close the orifice in the valve seat before the sleeve is brought in contact with the valve seat. The ball is held by the sleeve to the end of the valve stem, but so that it is free to revolve in its bearing, or, rather, stand still while the valve stem is being turned to press it upon the orifice of the valve seat, and thereby the wearing out of these parts is avoided.

The inventive features of my improved valve are shown in Figs. 1, 2 and 3. Referring thereto, 7 designates the valve stem or spindle, screw-threaded at 8, correspondingly with the interior screw-thread $8^a$ of the valve casing 22, shown in Fig. 4. The upper end of the valve stem 7 is squared off for setting thereon a handwheel 9, and screw-threaded, and the nut 10 screwed thereon to secure the handwheel 9 in its place. To this extent, the construction of the valve stem is that usually employed in valves.

The other end of the valve stem 7, designated 12 in the drawings, is reduced and screw-threaded correspondingly with the interior screw-thread in the sleeve 13. This sleeve is designed to hold the ball 11 to the end 12 of the stem. To this end, the ridge 15 is formed, on the lower end of the sleeve 13, reducing the bore of the sleeve to less than the diameter of the ball. When the ball 11 is dropped into the sleeve 13, it projects about three-sevenths of its diameter beyond the ridge 15, as shown in Fig. 1 of the drawing. The lock nut 14, also correspondingly screw-threaded, is provided to lock the sleeve 13 when screwed on into its position on the valve stem. When assembling these parts, the ball 11 is dropped into the sleeve 13, and the latter screwed onto the end 12 of the valve stem 7, until the ball is firmly held between the end of the valve stem and the ridge 15 of the sleeve. Then the sleeve 13 is turned about one-third of its circumference to the left, to loosen the ball 11, so it will be held turnably in the sleeve 13, between the ridge 15 and the end 12 of the stem. Then the lock nut 14 is screwed against the sleeve 13 to lock it in this position, and to prevent the valve stem from turning therein. The valve stem 7 is then inserted into the valve body or casing 22, through its lower end, the screw-threaded portion 8 thereof brought in engagement with the interior screw-thread 8ª of the valve casing.

The interiorly screw-threaded packing sleeve 23 serves as a stuffing box for the upper end of the valve stem, and for this purpose, this end of the valve casing 22 is correspondingly screw-threaded. A washer 24 of suitable packing material is set in the sleeve 23 to insure a fluid-tight inclosing of the valve stem in the valve casing. The handwheel 9 is set on the squared portion of the upper end of the valve stem 7, and the nut 10 is screwed thereon to hold the handwheel 9 thereon.

The valve seat 16 is formed, as shown in Fig. 3, as a perforated plug, or bushing, screw-threaded on its lower end. The screw-thread thereon corresponds with the interior screw-thread in the upper end of the shank 17. The offset or flange 18 is fluid-tightly fitted upon the end of the shank 17, and the squared off extension 19 serves to enable the valve seat to be gripped by a wrench, when screwing it in, or when removing it from the shank. The diameter of the bore 20, in the valve seat, is smaller than the diameter of the segment of the ball 11, projecting from the sleeve 13. The apex of the valve seat is finished off at right angle to the bore 20, forming a well-defined angular rim; the outer edge is beveled and rounded off, as shown in Figs. 3 and 4 of the drawing. The ball 11, the sleeve 13 and the valve seat 16 may be made of hard metal, capable of withstanding, for a long time, the wear to which these parts are subjected in valves used for the purposes for which my improved valve is designed.

The valve seat 16 is screwed into the upper end of the shank 17, and the shank into the lower, correspondingly screw-threaded, end of the valve casing. For this purpose, the lower end of the valve casing 22 is exteriorly squared, or made hexagonal, as indicated at 26, and a similarly formed offset 19 is provided on the shank 17. The adjoining surfaces of these parts are finished and fitted together to secure a fluid-tight joint between the shank and the lower end of the valve casing. The screw-threaded lower end 21 of the valve is adapted for screwing it into a tapping, or other fixture, to which the valve is to be connected. In place of the spout 27, formed on the valve casing, another form of outlet may be provided for connecting it to a pipe or other connection, according to where the valve is to be used.

When the stem 7 is screwed in to close the valve, the ball 11 comes first in contact with the rim of the bore 20 in the valve seat 16, and is pressed into it, thus fluid-tightly closing the orifice, before the inversely beveled face of the recessed end of the sleeve 13 contacts with the beveled and rounded off outer circumference of the valve seat, but after the ball 11 is pressed into the bore 20, the inverse bevel of the recessed end of the sleeve 13 is brought in close, fluid-tight, contact therewith, and thereby a supplemental closing of the valve is produced. It has been demonstrated, in practical use of my improved valve, that also this "supplemental" closing of the valve is absolutely fluid-tight, and that it is not necessary to screw in the valve stem as hard as required in other valves used for these purposes, for which my improved valve is designed, to insure a safe functioning of the valve for the purposes for which it is intended, and which heretofore was quite unattainable with other valves.

I claim as my invention:

1. A valve comprising a casing, a valve seat set therein, a stem movably fitted in the casing, and means for moving it to and from the valve seat; a sleeve, adjustably secured to the end of the stem and shaped at its free end to fit upon said valve seat, a ball adapted to close the opening in the valve seat, and means at the end of the sleeve, adapted to hold the ball therein; and means for securing the sleeve in its adjusted position on the stem; substantially as herein shown and described.

2. A valve comprising a casing, a shank secured in the casing, a valve seat secured therein; a stem, screw-threaded on its end, fitted in the casing, and means for moving it to and from the valve seat; an interiorly screw threaded sleeve, screwed on the end of the stem and shaped at its free end to fit upon said valve seat, a ridge on the end of the sleeve reducing its bore, a ball, adapted to close the opening in the valve seat, set in the sleeve between the ridge and the end of the stem, and means for locking the sleeve to the valve stem; substantially as herein shown and described.

3. A valve comprising a casing, an interiorly screw-threaded shank in the casing, a convexly shaped valve seat screwed therein; a stem, screw-threaded on its end, fitted in the casing, and means for moving it to and from the valve seat, an interiorly screw-threaded sleeve screwed on the end of the stem, a ridge reducing the bore, and a concave recess on the end of the sleeve adapted to seat on the convexly-shaped valve seat, a ball, adapted to close the opening in the valve seat, set in the sleeve between the ridge and the end of the stem, and means for locking the sleeve to the valve stem, substantially as herein shown and described.

4. A valve comprising a casing, a convexly shaped valve seat set therein, a valve stem fitted in the valve casing, and means for moving it to and from the valve seat in line therewith; a sleeve, concavely shaped on its end and adapted to fluid-tightly fit upon the convexly shaped valve seat and adjustably secured to the end of the valve stem; a ridge at the end of the sleeve in the apex of its concave recess; a ball, adapted to close the opening in the valve seat, set in the sleeve between the ridge and the end of the stem; and means for securing the sleeve to the valve stem; substantially as herein shown and described.

EDGAR A. KELSEY.

Witnesses:
 PAULA BATES,
 RACHEL LIEBERMAN.